United States Patent
Ohtsu et al.

(10) Patent No.: US 7,582,234 B2
(45) Date of Patent: *Sep. 1, 2009

(54) PRODUCING METHOD OF POLYMER OPTICAL WAVEGUIDE

(75) Inventors: Shigemi Ohtsu, Ashigarakami-gun (JP); Keishi Shimizu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 618 days.

This patent is subject to a terminal disclaimer.

(21) Appl. No.: 10/733,454

(22) Filed: Dec. 12, 2003

(65) Prior Publication Data

US 2004/0245660 A1 Dec. 9, 2004

(30) Foreign Application Priority Data

Jun. 4, 2003 (JP) .............................. 2003-159129

(51) Int. Cl.
B29D 11/00 (2006.01)

(52) U.S. Cl. ...................... 264/1.27; 264/1.36; 264/1.38

(58) Field of Classification Search ................. 264/1.24, 264/1.27, 1.28, 1.36, 1.38; 385/14
See application file for complete search history.

(56) References Cited

U.S. PATENT DOCUMENTS

| | | | |
|---|---|---|---|
| 4,884,434 A | 12/1989 | Satake et al. | |
| 5,716,556 A | 2/1998 | Heard | |
| 5,949,945 A | 9/1999 | Okano et al. | |
| 5,999,670 A | 12/1999 | Yoshimura et al. | |
| 6,243,517 B1 | 6/2001 | Deacon | |
| 6,314,228 B1 | 11/2001 | Korenaga et al. | |
| 6,355,198 B1 * | 3/2002 | Kim et al. | .................... 264/259 |
| 6,500,603 B1 | 12/2002 | Shioda | |
| 6,901,198 B2 * | 5/2005 | Shimizu et al. | .............. 385/129 |

(Continued)

FOREIGN PATENT DOCUMENTS

JP          A-60-250915          12/1985

(Continued)

OTHER PUBLICATIONS

Younan Xia et al.; "Soft Lithography"; Annu. Rev. Mater. Sci.; 1998; vol. 28; pp. 153-184.

(Continued)

*Primary Examiner*—Mathieu D. Vargot
(74) *Attorney, Agent, or Firm*—Oliff & Berridge, PLC (57) ABSTRACT

A method for producing a polymer optical waveguide including: (1) preparing a template that is made of a template forming curable resin and has a concave portion, (2) applying an ozone treatment or irradiating light having a wavelength of 300 nm or less to at least one of a surface of the template having the concave portion and a core formation surface of a cladding film substrate, (3) bringing the cladding film substrate into close contact with the template, (4) filling a core forming curable resin into the concave portion of the template with which the cladding film substrate is in close contact, (5) curing the filled core forming curable resin to form a core, (6) removing the template from the cladding film substrate, and (7) forming a cladding layer on the cladding film substrate on which the core has been formed.

17 Claims, 5 Drawing Sheets

U.S. PATENT DOCUMENTS

| | | |
|---|---|---|
| 6,968,109 B2 | 11/2005 | Furuyama |
| 7,174,057 B2 | 2/2007 | Shimizu et al. |
| 7,294,292 B2 | 11/2007 | Akutsu et al. |
| 7,317,861 B2 | 1/2008 | Ohtsu et al. |
| 2002/0114556 A1 | 8/2002 | Kato et al. |
| 2005/0133943 A1 | 6/2005 | Akutsu et al. |
| 2005/0163446 A1 | 7/2005 | Shimizu et al. |
| 2005/0238278 A1 | 10/2005 | Nakashiba et al. |

FOREIGN PATENT DOCUMENTS

| | | |
|---|---|---|
| JP | A 02-155704 | 6/1990 |
| JP | A 05-066435 | 3/1993 |
| JP | A 06-114845 | 4/1994 |
| JP | A-06-216175 | 8/1994 |
| JP | A 06-304933 | 11/1994 |
| JP | A 08-507800 | 8/1996 |
| JP | A 09-269429 | 10/1997 |
| JP | A 10-090532 | 4/1998 |
| JP | A 10-130323 | 5/1998 |
| JP | A 10-300961 | 11/1998 |
| JP | A 11-003545 | 1/1999 |
| JP | A 2000-039530 | 2/2000 |
| JP | A 2000-039531 | 2/2000 |
| JP | A-2000-81520 | 3/2000 |
| JP | A 2000-235127 | 8/2000 |
| JP | A 08-160239 | 1/2001 |
| JP | A 2001-027714 | 1/2001 |
| JP | A 2001-269958 | 10/2001 |
| JP | A 2002-086462 | 3/2002 |
| JP | A 2002-086515 | 3/2002 |
| JP | A 2002-088120 | 3/2002 |
| JP | A 2002-090565 | 3/2002 |
| JP | A-2002-146066 | 5/2002 |
| JP | A 2002-284812 | 10/2002 |
| JP | A 2002-311273 | 10/2002 |
| JP | A 2002-333538 | 11/2002 |
| JP | A-2002-365429 | 12/2002 |
| JP | A 2003-084157 | 3/2003 |
| JP | A 2004-029507 | 1/2004 |
| JP | A 2004-086144 | 3/2004 |
| JP | A 2004-109927 | 4/2004 |
| WO | A-10-90532 | 4/1998 |

OTHER PUBLICATIONS

B. Michel et al.; "Printing meets lithography: Soft approaches to high-resolution patterning"; IBM J. Res. & Dev.; vol 45, No. 5; Sep. 2001; pp. 697-719.

Yoshiharu Wada, "New Transparent Polymer with Excellent Heat Resistance 'ARTON'", Kinou Zairyou (Fountional Material), Jul. 5, 2000, vol. 20. Nov. 8, pp. 16-22.

Whitesides et al., "The Art of Building Small," Scientific American, pp. 39-47, Sep. 2001.

Xia et al., "Soft Lithography," Annu. Rev. Mater. Sci., pp. 153-184, 1998.

U.S. Appl. No. 10/801,803, filed Mar. 2004, Akutsu et al.

B. Michel et al., "Printing Meets Lithography: Soft Approaches to High-Resolution Patterning," IBM J. Res. & Dev., vol. 45, No. 5, pp. 697-719, Sep. 2001.

Xiao-Mei Zhao et al., "Fabrication of Single-Mode Polymeric Waveguides Using Micromolding in Capuillaries", Advanced Materials, vol. 8, No. 5, pp. 420-424, May 1996.

R. Hsu et al., "Formation of Micro-Sized Cycloolefin Copolymer from Toluene Solution Using Compressed HFC-134a As Antisolvent", Applied Polymer Science, vol. 84, No. 9, pp. 1657-1668.

Y. Wada, "Function & Materials", vol. 20, No. 8, pp. 16-22, Aug. 2000.

H. Shinohara, "Chemistry & Economy", vol. 44, No. 14, pp. 74-82, Dec. 1997.

Y. Wada, "Function & Materials", vol. 13, No. 1, pp. 40-52, Jan. 1993.

\* cited by examiner

PRODUCING METHOD OF POLYMER OPTICAL WAVEGUIDE

CROSS-REFERENCE TO RELATED APPLICATION

This application claims priority under 35USC 119 from Japanese Patent Application No. 2003-159129, the disclosure of which is incorporated by reference herein.

BACKGROUND OF THE INVENTION

1. Field of the Invention

The present invention relates to a method of producing an optical waveguide, in particular, a flexible polymer optical waveguide.

2. Description of the Related Art

The methods of producing a polymer optical waveguide which have been proposed include (1) a method in which a film is impregnated with a monomer followed by selectively exposing a core portion to vary the refractive index further followed by laminating a film (selective polymerization method), (2) a method in which a core layer and a cladding layer are coated followed by forming a clad portion by use of a reactive ion etching (RIE method), (3) a method in which a photolithography method in which by use of a UV curable resin that is obtained by adding a photosensitive material to polymer, exposure and development are performed is used (direct exposure method), (4) a method that makes use of an injection molding, (5) a method in which a core layer and a cladding layer are coated followed by exposing a core portion to vary the refractive index of the core portion (photo-bleaching method) and so on.

However, the selective polymerization method according to (1) has a problem in lamination of films; methods according to (2) and (3), owing to the use of the photolithography, result in high cost; and the method according to (4) has a problem in accuracy of an obtained core diameter. Furthermore, the method according to (5) has a problem in that sufficient difference of the refractive indexes cannot be obtained between the core layer and the cladding layer.

At present, practical methods excellent in the performance are only those according to (2) and (3); however, these have the problem of cost as mentioned above. Furthermore, all of methods (1) through (5) cannot be applied to form a polymer optical waveguide on a large area and flexible plastic material.

Furthermore, as a method of producing a polymer optical waveguide, a method is known in which a patterned substrate (clad) where a groove pattern that becomes a capillary is formed is filled by a polymer precursor material for a core followed by curing to form a core further followed by laminating a plane substrate (clad) thereon. However, in the method, not only in the capillary groove but also totally between the patterned substrate and the plane substrate, the polymer precursor material is thinly filled and cured to form a thin layer having the composition the same as the core layer; as a result, there is a problem in that light leaks through the thin layer.

As a method to overcome the problem, David Heard has proposed a method in which a patterned substrate on which a pattern of a groove that becomes a capillary is formed and a plane substrate are solidly fixed by a clamping jig and furthermore a contact portion of the patterned substrate and the plane substrate is sealed with a resin followed by reducing the pressure to fill a monomer (diallyl isophthalate) solution into the capillary, and thereby a polymer optical waveguide is manufactured (Japanese Patent No. 3151364). This is a method in which as a core forming resin material, instead of the polymer precursor material, a monomer is used to make the viscosity of a filling material lower, and thereby the monomer is allowed to fill the capillary by making use of a capillary phenomenon and not allowed to fill other than the capillary.

However, since the method uses a monomer as the core forming material, when the monomers are polymerized to form a polymer, the volume contraction rate becomes large; as a result, there is a problem in that a large transmission loss of the polymer optical waveguide is caused.

Furthermore, the method is a troublesome method in which the patterned substrate and the plane substrate are firmly held by use of the clamp or additionally the contact portion is sealed with a resin, and thus the method is not suitable for the mass-production. Accordingly the cost reduction cannot be achieved. Still furthermore, it is impossible to apply this method to manufacturing a polymer optical waveguide when a film having a thickness of millimeter order or 1 mm or less is used as the cladding material.

Still furthermore, recently, George M. Whitesides et al. of Harvard University, as a novel technology to obtain a nano structure, have proposed a method called a capillary micromold as one of soft lithography. This is a method in which a master substrate is formed by making use of photolithography; by making use of adhesiveness and peelability of polydimethylsiloxane (PDMS), a nano structure of the master substrate is replicated on a template of PDMS; and liquid polymer is filled in the template by making use of the capillary phenomenon followed by solidifying it. In Scientific American, September 2001 (Nikkei Science, December 2001), a detailed explanatory article can be found.

Furthermore, a patent as to the capillary micro-mold method has been applied by Kim Enoch et al of a group of George M. Whitesides of Harvard University (U.S. Pat. No. 6,355,198).

However, even when the producing method described in the patent is applied to the manufacture of a polymer optical waveguide, since a cross section area of a core portion of the optical waveguide is small, the formation of the core portion takes a long time. Accordingly, the method is not suitable for the mass-production thereof. Furthermore, there is a disadvantage in that when a monomer solution polymerizes to form polymers, a volume change is caused to result in change in shape of the core; and thus the transmission loss becomes larger.

Furthermore, B. Michel et al. of IBM's Zurich Research Laboratory have proposed a high resolution power lithography technique that uses PDMS and reported that according to the technique the resolution power of several tens nanometers could be obtained. A detailed explanatory article is described in IBM J. REV. & DEV., VOL. 45 No. 5 Sep. 2001.

Thus, the soft lithography technique and capillary micromolding method that use PDMS are recently gathering attention as nano-technology primarily in USA.

However, when an optical waveguide is prepared by use of the micro-molding method as mentioned above, making the volume contraction rate smaller during the curing (that is, making the transmission loss smaller) and lowering the viscosity of a filling liquid (monomer or the like) to realize easy filling cannot be rendered compatible. Accordingly, when the transmission loss is preferentially made smaller, since the viscosity of the filling liquid cannot be reduced to a certain limit or less, the filling speed becomes slower, and the mass-production cannot be expected. Furthermore, the micro-molding method presumes the use of a glass or silicon substrate as the substrate, that is, a flexible film material is not considered to use.

It is desired from a viewpoint of expanding applications to expand the degree of freedom of selection of materials that can be used as the cladding film substrate. Furthermore, in the method of producing a polymer optical waveguide, as the core forming curable resin and the cladding layer forming curable resin, furthermore as an adhesive for adhering a cladding layer (cladding film) to a core formation surface, a UV curable resin, a heat-curable resin or the like are used; however, the UV curable resins and the heat-curable resins, depending on the kind thereof, are not necessarily sufficient in the adherence with the cladding film substrate. Accordingly, an improvement in adhesiveness of the cladding film substrate and a core and a cladding layer is also desired.

On the other hand, as the surface modification method of polymers, various methods have been known. Recently, JP-A Nos. 2002-365429 and 2002-146066 have proposed a method in which short wavelength UV light is irradiated on a surface of polymer to heighten the hydrophilicity thereof. JP-A No. 2002-365429 discloses a method in which UV light having a wavelength of 200 nm or less is irradiated on an adhesion surface of a transparent protective film for use in polarization plate that is adhered to a polarizer through an adhesive layer to increase the hydrophilicity of a surface of a protective film, and thereby improving an anchor effect with the polarizer that is hydrophilic. The use of a low-pressure mercury lamp and a xenon excimer lamp are shown as the UV treatment with a UV light source having a wavelength of 200 nm or less. Furthermore, JP-A No. 2002-146066 describes a method in which as a surface modification method (making hydrophilic) of a fluorinated polymer product, in the presence of water or water vapor, a vacuum UV fluorine laser having a wavelength of 157 nm is irradiated.

However, in JP-A Nos. 2002-365429 and 2002-146066, there are no suggestions of modifying a cladding film substrate and a template surface to improve the filling speed in the micro-molding method.

SUMMARY OF THE INVENTION

The present invention is achieved in view of the above problems and the object thereof is to provide a method of producing, by a simple and convenient method, a polymer optical waveguide that is low in cost, improved in productivity and large in the degree of freedom of selection of cladding film substrates.

The above problems can be overcome by providing the following method of producing a polymer optical waveguide.

A first aspect of the invention is to provide a method for producing a polymer optical waveguide comprising the steps of (1) preparing a template that is made of a template forming curable resin and has a concave portion corresponding to an optical waveguide core convex portion, (2) applying an ozone treatment or irradiating light having a wavelength of 300 nm or less to at least one of a surface of the template having the concave portion and a core formation surface of a cladding film substrate, (3) bringing the cladding film substrate into close contact with the template, (4) filling a core forming curable resin into the concave portion of the template with which the cladding film substrate is in close contact, (5) curing the filled core forming curable resin to form a core, (6) removing the template from the cladding film substrate, and (7) forming a cladding layer on the cladding film substrate on which the core has been formed.

A second aspect of the invention is to provide a method for producing a polymer optical waveguide comprising the steps of (1) preparing a template that is made of a template forming curable resin and has a concave portion corresponding to an optical waveguide core convex portion, (2) applying an ozone treatment or irradiating light having a wavelength of 300 nm or less to at least one of a surface of the template having the concave portion and a core formation surface of a cladding film substrate, (3) bringing the cladding film substrate into close contact with the template, (4) filling a core forming curable resin into the concave portion of the template with which the cladding film substrate is in close contact, and (5) curing the filled core forming curable resin to form a core, wherein the template is light transmissive, and difference between a refractive index of the template and that of the core is 0.01 or more.

DETAILED DESCRIPTION OF THE INVENTION

A producing method of a polymer optical waveguide according to the present invention includes the following steps of (1) through (7).

(1) Preparing a template that is made of a template forming curable resin and has a concave portion corresponding to an optical waveguide core convex portion, (2) applying an ozone treatment or irradiating light having a wavelength of 300 nm or less onto a surface of the template having the concave portion and/or a core formation surface of a cladding film substrate, (3) bringing the cladding film substrate into close contact with the template, (4) filling a core forming curable resin into the concave portion of the template with which the cladding film substrate is in close contact, (5) curing the filled core forming curable resin to form a core, (6) removing the template from the cladding film substrate, and (7) forming a cladding layer on the cladding film substrate on which the core has been formed.

The method of producing a polymer optical waveguide according to the invention has extremely simplified production steps and allows easy production of a polymer optical waveguide. Accordingly, in comparison with existing methods of producing a polymer optical waveguide, a polymer optical waveguide can be manufactured at extremely low cost.

Furthermore, according to a producing method of a polymer optical waveguide according to the invention, a flexible polymer optical waveguide whose shape and the like can be freely set, and which has low transmission loss and high accuracy and can be freely mounted on various instruments, can be obtained.

Moreover, a method of producing a polymer optical waveguide is provided that is improved with respect to a filling speed of a core forming curable resin into a template concave portion, and that is high in productivity, and in addition, a range of choice of core materials, cladding film substrates and materials for cladding layers for a polymer optical waveguide can be expanded.

In the following, a method of producing a polymer optical waveguide according to the invention will be explained in the order of processing.

(1) Preparing a Template that is Made of a Template Forming Curable Resin and has a Concave Portion Corresponding to an Optical Waveguide Core Convex Portion Here, "an optical waveguide core convex portion" is defined as a convex portion corresponding to a core of an optical waveguide.

Although the preparation of a template is preferably performed by use of an original master on which a convex portion corresponding to an optical waveguide core is formed, it is not limited thereto. In the following, a method that uses an original master will be explained.

<Preparation of Original Master>

In the preparation of an original master on which a convex portion corresponding to an optical waveguide core is formed, an existing method; for instance, a photolithography method can be used without particular restrictions. Furthermore, a method that was applied formerly by the present inventors and prepares a polymer optical waveguide according to an electrodeposition process or an optical electrodeposition process (JP-A No. 2002-333538) can be also applied to prepare an original master. A magnitude of the convex portion corresponding to the optical waveguide core formed on the original master can be appropriately determined depending on applications of the polymer optical waveguide. For instance, in the case of a single mode optical waveguide, a core of approximately 10 μm square is generally used, and in the case of a multi-mode optical waveguide, a core of approximately from 50 to 100 μm square is generally used. However, depending on applications, an optical waveguide having a further larger core of approximately several hundreds micrometers is utilized.

<Preparation of Template>

The template is prepared in such a way that on a surface where a convex portion corresponding to the optical waveguide core of the original master prepared as mentioned above is formed, a template forming curable resin is coated or injected, after, as needs arise, drying is performed, the resin is cured, subsequently the cured resin layer is peeled, and thereby the template is prepared. Furthermore, the template is provided with an inlet for filling a core forming curable resin in a concave portion that corresponds to the convex portion and an outlet for exhausting the resin from the concave portion corresponding to the convex portion; however, there are no particular restrictions on formation methods thereof. There is a method in which the original master is provided with convex portions corresponding to an inlet and an outlet in advance. However, examples of a simple and convenient method include a method in which after a cured resin layer of a template forming curable resin is formed on an original master, the cured resin layer is peeled to obtain a mold, thereafter, both ends of the mold are cut so that the concave portion may be exposed, and thereby an inlet and an outlet are formed.

A thickness of the cured resin layer, though appropriately determined in consideration of the handling properties as the template, is generally preferable to be approximately in a range of 0.1 to 50 mm.

Furthermore, it is preferable to apply a mold release agent or the like to the original master in advance so as to expedite peeling of the template therefrom.

The template forming curable resin is preferably easy in peeling a cured material thereof off the original master, more than definite values in the mechanical strength and dimensional stability as a template (that is repeatedly used), hard enough to maintain a shape of the concave portion and excellent in adhesiveness with the cladding film substrate. To the template forming curable resin, as needs arise, various kinds of additives may be added.

The template forming curable resin is necessary to be capable of coating or injecting on a surface of the original master and to accurately copy the convex portions corresponding to individual optical waveguide cores formed on the original master. Accordingly, the template forming curable resin preferably has the viscosity equal to or less than a certain limit, for instance, approximately from 500 to 7000 mPa·s. (Among the "template forming curable resins" that are used in the invention, ones that become an elastic rubber-like body after the curing are also included.) Furthermore, a solvent for adjusting the viscosity may be added up to an extent that does not exhibit adverse affect of the solvent.

As the template forming curable resin, from viewpoints of the peelability, mechanical strength and dimensional stability, hardness, and adhesiveness with the cladding substrate as mentioned above, curable organo-polysiloxane that becomes, after the curing, silicone rubber (silicone elastomer) or silicone resin is preferably used. As the curable organo-polysiloxane, ones that have a methyl siloxane group, ethyl siloxane group and phenyl siloxane group in a molecule are preferable. Furthermore, the curable organo-polysiloxane may be either one of a one-component type and a two-component type in which a curing agent is combined, furthermore may be either one of a heat-curable type and a room temperature curable type (for instance, one that is cured by moisture in air), and still furthermore may be one that uses other curing (UV curing or the like).

As the curable organo-polysiloxane, one that becomes silicone rubber after curing is preferable, for this one that is ordinarily called a liquid silicone rubber (in the "liquid", one that is high in the viscosity such as a pasty one is included) is used, and the two-component type that is used in combination with a curing agent is preferable. Among these, an addition type liquid silicone rubber can be cured uniformly from surface to the inside thereof in a short period of time, does not generate a by-product at that time or generates less, is excellent in the mold-releasing properties and small in the contraction rate. Accordingly, it can be preferably used.

Among the liquid silicone rubbers, from the viewpoints of adhesiveness, peelability, strength and hardness, liquid dimethyl siloxane rubber is particularly preferable. Furthermore, since a cured body of the liquid dimethyl siloxane rubber is generally such low in the refractive index as approximately 1.43, a template made therefrom, without peeling off the cladding substrate, can be utilized as it is as a cladding layer. In this case, a device that does not allow the template and the filled core forming resin and cladding substrate to peel off each other is necessary.

The viscosity of the liquid silicone rubber, from the viewpoints of accurately copying the convex portions corresponding to the optical waveguide cores, making air bubbles mingle less and thereby making degassing easier and forming a template having a thickness of several millimeters, is preferably in the range of approximately from 500 to 7000 mPa·s, and more preferably in the range of approximately from 2000 to 5000 mPa·s.

Furthermore, a surface energy of the template is, in view of adhesiveness with the substrate film, in a range of 10 to 30 dyn/cm, and preferably from 15 to 24 dyn/cm.

The Share rubber hardness of the template is in a range of 15 to 80 and preferably in a range of 20 to 60 from the viewpoints of the molding performance, maintenance of concave shape and peelability.

The surface roughness (root-mean-square (RMS) roughness) of the template is 0.2 μm or less and preferably 0.1 μm or less from the viewpoint of the molding properties.

Furthermore, the template is preferably light transmissive in a UV region and/or visible region. The reason for the template being preferable to be light transmissive in the visible region exists in that when the template is brought into close contact with the cladding film substrate in the (2) below, positional alignment can be easily performed, and in the (3) below, the situations where the core forming curable resin is filled in the template concave portion can be observed and thereby completion of the filling or the like can be easily confirmed. Still furthermore, the reason for the template being preferable to be light transmissive in the UV region exists in that in the case of a UV curable resin being used as the core forming curable resin, the UV light curing is performed through the template. In this case, the transmittance of the template in the UV region (from 250 to 400 nm) is preferably 80% or more.

Curable organo-polysiloxane, especially liquid silicone rubber that becomes silicone rubber after being cured, is excellent in the properties of adhesiveness with the cladding substrate and peelability therefrom, which are usually incompatible with each other. It has the capability of copying a nanostructure, and can also protect from the intrusion of liquid when the silicone rubber and the cladding substrate are brought into close contact. The template that uses such silicone rubber can copy an original master with high precision and come into close contact with the cladding substrate. Accordingly, only in the concave portion between the template and the cladding substrate the core forming resin can be efficiently filled and furthermore the cladding substrate and the template can be easily peeled. Accordingly, from the template, a polymer optical waveguide that maintains a shape with high precision can be extremely easily prepared.

Furthermore, in the case of the cured resin layer, in particular in the case of the cured resin layer having the rubber elasticity, part of the cured resin layer, that is, a portion other than a portion that copies a convex portion of the original master can be replaced by other stiff material. In this case, the handling properties of the template can be improved.

(2) Applying Ozone Treatment or Irradiating Light Having a Wavelength of 300 nm or Less onto a Surface of the Template Having Concave Portion and/or a Core Formation Surface of a Cladding Film Substrate In a method of producing a polymer optical waveguide according to the invention, before bringing the cladding film substrate and the template into close contact, ozone treatment or irradiation of light having a wavelength of 300 nm or less is applied in advance to a surface of the template where a concave portion is formed and/or a core formation surface of the cladding film substrate. Here, "a core formation surface of the cladding film substrate" is defined as a surface of the cladding film substrate, on which surface a core is to be formed. When the above-mentioned treatment is applied to the core formation surface of the cladding film substrate, the adhesiveness of the film substrate can be improved. Accordingly, the adhesiveness of the film substrate with respect to the core formed thereon and with respect to the cladding layer can be improved. Furthermore, as a result, films so far considered to be poor in adhesiveness with respect to the core and the cladding layer can now be used as the cladding film substrate. Still furthermore, when the surface modification treatment is applied to a surface of the template where the concave portion is formed or to this surface and also to a core formation surface of the cladding substrate, the wettability of the core formation curable resin is heightened at a surface of the template concave portion or at this surface and also at a core formation surface of the cladding film substrate, resulting in an increase in the filling speed.

In the ozone treatment, ozone generators such as one that utilizes discharge, one that uses a high-pressure mercury lamp, and one that utilizes vacuum VU light are used.

Furthermore, examples of a light source that is used for the irradiation of light having a wavelength of 300 nm or less include excimer laser lamps that can irradiate light having emission center wavelengths at 126 nm, 146 nm, 172 nm, 222 nm and so on. More specifically a dielectric barrier discharge excimer lamp can be used. Other than this, a low-pressure mercury lamp that irradiates UV rays at 185 nm and 254 nm can be used. Still furthermore, laser light also can be used; for instance, an excimer laser or the like such as a vacuum UV fluorine laser having a wavelength at 157 nm can be used.

Furthermore, short wavelength UV rays (200 nm or less) in particular convert oxygen in the air to ozone. Accordingly, in the irradiation treatment with short wavelength UV rays, surfaces of the template and the film are exposed not only to the UV rays but also to ozone; and thus, the treatment with short wavelength UV rays is high in the surface modification effect.

The ozone treatment is applied by appropriately adjusting an ozone concentration in an atmosphere and a treatment period of time. Furthermore, the irradiation of light having a wavelength of 300 nm or less is performed by appropriately adjusting a wavelength, output, and irradiation period of UV rays.

Furthermore, depending on the materials that are used as the cladding film substrate, core material and cladding layer, the treatment conditions are necessary to be set appropriately. For instance, in the case of adhesiveness between the cladding film substrate and a combination of the core material and the cladding layer that are disposed thereon being low, a more intense surface modification is applied. On the other hand, when an intense surface modification is applied onto a surface where a concave portion of the template is formed, since the adherence to the surface of the template concave portion becomes too high, in some cases, the mold releasing properties in peeling the template may be damaged. Accordingly, it is preferable to apply appropriate treatment in consideration of the core material and the template material.

In general, the ozone treatment condition, in the case of an atmosphere where an ozone concentration is approximately from 50 to 400 ppm, is approximately from 40 to 100 s.

Furthermore, the period for irradiation of light having a wavelength of 300 nm or less, for instance, in the case of a xenon excimer lamp (output 10 mW/cm$^2$) having a center emission wavelength of 172 nm, is approximately 1 to 3 minutes.

As the surface modifications as mentioned above, treatments described in JP-A Nos. 2002-365429 and 2002-146066 can be appropriately utilized.

(3) Bringing the Cladding Film Substrate into Close Contact with the Template An optical waveguide according to the invention can be used also as a coupler, and an optical interconnection and optical splitter between boards. Accordingly, in accordance with the applications thereof, a material of the film substrate is selected in consideration of the optical characteristics such as the refractive index, light transmittance, etc., mechanical strength, heat-resistance, flexibility and so on of the material. It is preferable to prepare, by use of a flexible film substrate, a polymer optical waveguide having the flexibility.

Examples of the film material include acrylic resins (polymethyl methacrylate or the like), alicyclic acrylic resins, styrenic resins (polystyrene, acrylonitrile/styrene copolymer or the like), olefinic resins (polyethylene, polypropylene, ethylene/propylene copolymer or the like), alicyclic olefinic resins, vinyl chloride resins, vinylidene chloride resins, vinyl alcohol resins, vinyl butyral resins, allylate resins, fluorine-containing resins, polyester resins (polyethylene terephthalate, polyethylene naphthalate or the like), polycarbonate resins, di- or triacetate celluloses, amide resins (aliphatic, aromatic amides or the like), imide resins, sulfonic resins, polyether sulfonic resins, polyether ether ketone resins, polyphenylene sulfide resins, polyoxymethylene resins, or blends of the above resins.

As the alicyclic acrylic resin, OZ-1000, OZ-1100 (manufactured by Hitachi Chemical Co., Ltd.) and so on in that an aliphatic cyclic hydrocarbon such as tricyclodecane or the like is introduced in an ester substituent are used.

Furthermore, examples of the alicyclic olefinic resin include those having a norbornene structure on a main chain and those having a norbornene structure on a main chain and a polar group such as an alkyloxycarbonyl group (alkyl group with from 1 to 6 carbon atoms or cycloalkyl group) on a side chain. Among these, alicyclic olefinic resins as mentioned above that have a norbornene structure on a main chain and a polar group such as an alkyloxycarbonyl group on a side chain have the excellent optical characteristics such as being low in the refractive index (since the refractive index is approximately 1.50, the difference with the refractive index of the core clad can be secured) and being high in the light transmittance, are excellent in adhesiveness with the template, and furthermore excellent in the heat-resistance. Accordingly, these are particularly preferable for the preparation of a polymer optical waveguide according to the invention.

The refractive index of the film substrate, in order to secure the refractive index difference with the core, is preferably made less than 1.55, and more preferably made less than 1.53.

Furthermore, a thickness of the film substrate is appropriately selected in consideration of the flexibility, stiffness and easiness of handling, and is generally preferable to be in the range of approximately from 0.1 mm to 0.5 mm.

Still furthermore, as the cladding film substrate, a film with clad in which a clad material is coated on a film also can be used. In this case, the film can be improved in the flatness. Furthermore, materials that are high in the birefringence and not suitable for the clad material, or materials that are inferior in the transparency also can be made usable.

(4) Filling a Core Forming Curable Resin into the Concave Portion of Template with which the Cladding Film Substrate is in Close Contact In the process, while a core forming curable resin is filled in a concave portion of a template from an inlet of the template owing to the capillary phenomenon, the core forming curable resin filled in the concave portion is exhausted from the outlet.

As the core forming curable resin, radiation curable, electron beam curable, and thermosetting resins can be used, and among these, UV curable resins and thermosetting resins can be preferably used.

As the core forming UV curable resins or thermosetting resins, UV curable or thermosetting monomers, oligomers or mixtures of monomer and oligomer can be preferably used.

Furthermore, as the UV curable resin, epoxy, polyimide, and acrylic UV curable resins can be preferably used.

In order for a core forming curable resin to fill, owing to the capillary phenomenon, a gap (concave portion of the template) formed between the template and the film substrate, the core forming curable resin that is used is necessary to be enough low in the viscosity to an extent that enables it. Accordingly, the viscosity of the curable resin is made in a range of 10 to 2000 mPa·s, preferably from 20 to 1000 mPa·s, and more preferably from 30 to 500 mPa·s.

Other than these, in order to reproduce with high fidelity an original shape that the convex portion corresponding to the optical waveguide core formed on the original master has, a volume change before and after the curing of the curable resin is necessarily small. For instance, a decrease in the volume causes the waveguide loss. Accordingly, the volume change of the curable resin is desirably as small as possible; that is, it is desirable to be 10% or less and preferably 6% or less. Making the viscosity low by use of a solvent, being large in the volume change before and after the curing, is desirably to be avoided.

In order to make the volume change (contraction) after the curing of the core forming curable resin smaller, a polymer can be added to the resin. As the polymer, one that is compatible with the core forming curable resin and does not adversely affect on the refractive index, elasticity and light transmittance of the resin is preferable. The addition of the polymer, in addition to making the volume change smaller, enables to precisely control the viscosity and the glass transition temperature of the cured resin. As the polymer, for instance, acrylic resins, methacrylic resins, and epoxy resins are used; however, the polymer is not limited thereto.

The refractive index of the cured body of the core forming curable resin is necessarily larger than that of a clad (including the cladding film substrate and the cladding layer in the following (7)); it should be 1.50 or greater, and preferably 1.53 or more. The difference between the refractive index of the clad (including the cladding film substrate and the cladding layer in the following (7)) and that of the core is 0.01 or more and preferably 0.03 or more.

Furthermore, in the process, in order to expedite the filling of the core forming curable resin due to the capillary phenomenon into the template concave portion, a total system is desirably reduced in pressure (approximately from 0.1 to 200 Pa) or suctioned by use of a through hole.

Still furthermore, in order to expedite the filling, in addition to the reduction of pressure of the system, the core forming curable resin that is filled in from the inlet of the template can be effectively heated to lower the viscosity.

(5) Curing the Filled Core Forming Curable Resin to Form a Core

The filled core forming curable resin is cured. In curing a UV curable resin, a UV lamp, UV LED, UV irradiation device and so on are used. Furthermore, in curing a thermosetting resin, an oven or the like is used for heating.

(6) Removing the Template from the Cladding Film Substrate

After the process (5), the template is removed from the cladding film substrate. The template that is used in the (1) through (3), when the conditions of the refractive index and so on are satisfied, can be used as the cladding layer. In this case, without removing the template, the template can be used as it is as the cladding layer. When the template is used as the cladding layer as it is, the template is preferably light transmissive, and difference between a refractive index of the template and that of the core formed in the step of (5) is 0.01 or more. In this case, in order to improve adhesiveness between the template and the core, the template is preferably subjected to ozone treatment.

(7) Forming a Cladding Layer on the Cladding Film Substrate on which the Core has been Formed A cladding layer is formed on the film substrate on which a core is formed. Examples of the cladding layer include a film (the cladding film substrate such as used in, for instance, the (2) can be similarly used), a layer obtained by coating a cladding curable resin followed by curing, a polymer film obtained by coating a solvent solution of a polymer material followed by drying and so on. As the cladding curable resin, UV-curable resins and thermosetting resins are preferably used. Examples thereof include UV-curable or thermosetting monomers, oligomers or mixtures of monomer and oligomer.

In order to make the volume change (contraction) after the curing of the clad forming curable resin smaller, a polymer (for instance, methacrylic acid base, epoxy base) that is compatible with the resin and does not adversely affect on the refractive index, elasticity, and the transmittance of the resin can be added to the resin.

Furthermore, in the case of a film being used as the cladding layer, the surface modification treatment of the film that was applied prior to the (2) can be similarly applied. It is effective when a film low in adhesiveness is used.

In the case of a film being used as the cladding layer, an adhesive is used to adhere. In this time, the refractive index of the adhesive is desirably as close as possible to that of the film. As the adhesive that is used, the UV-curable resins or thermosetting resins can be preferably used. Examples thereof include UV-curable or thermosetting monomers, oligomers or mixtures of monomer and oligomer.

In order to make the volume change (contraction) after the curing of the UV-curable or thermosetting resin smaller, a polymer similar to that added to the cladding layer can be added.

The refractive index of the cladding layer, in order to secure the refractive index difference with the core, is made 1.55 or less and preferably 1.53 or less. Furthermore, the refractive index difference between the cladding substrate and the cladding layer is preferably smaller; the difference is within 0.05, preferably within 0.001 and furthermore preferably no difference from the viewpoint of the confinement of light.

In a method of producing a polymer optical waveguide according to the invention, in particular, a combination where as the template forming curable resin, liquid silicone rubbers that become rubber-like form after curing, especially liquid dimethyl siloxane rubber, is used and as the cladding film substrate, an alicyclic olefinic resin that has a norbornene structure on a main chain and a polar group such as an alkyloxycarbonyl group, etc. on a side chain is used is preferable. In this combination, adhesiveness between the template and the cladding film substrate is quite good, the concave portion structure of the template does not deform, a curable resin can be speedily filled into the concave portion owing to the capillary phenomenon even when a cross sectional area of the concave portion structure is extremely small (for instance, a rectangle of 10×10 μm).

Subsequently, with reference to FIGS. 1A through 1G and FIG. 2, one mode of a method of producing a polymer optical waveguide according to the invention will be explained. FIGS. 1A through 1G are schematic diagrams showing the respective producing steps of the invention, and FIG. 2 is a perspective view showing a state (step shown in FIG. 1D) where a template is brought into contact with a cladding film substrate that is a size larger than the template.

Figure 1A:
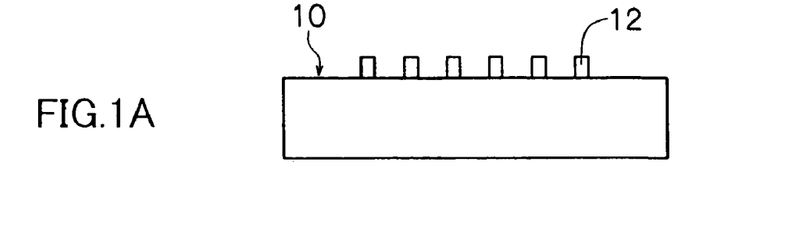
FIGS. 1A through 1G are schematic diagrams showing one example of a producing process of a polymer optical waveguide according to the present invention.
Figure 2:
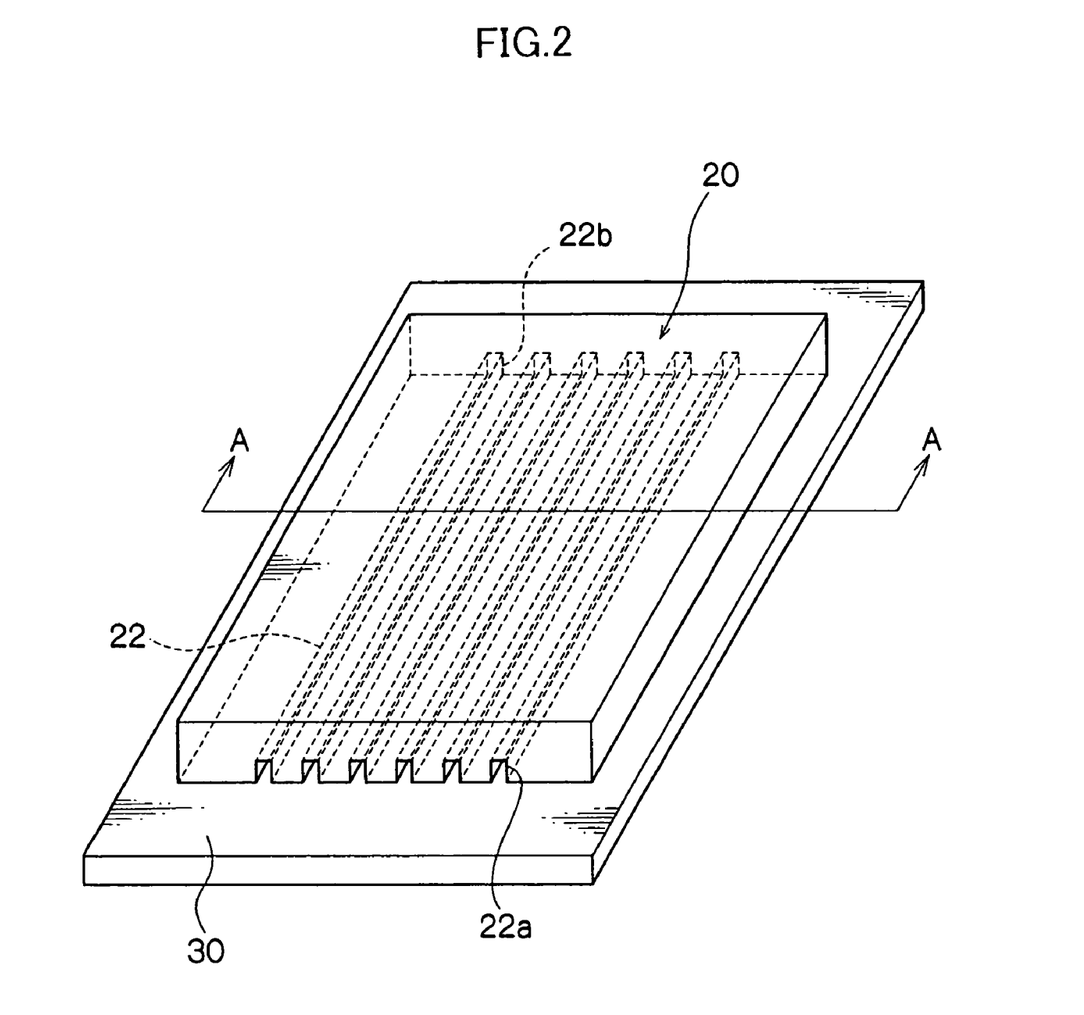
FIG. 2 is a perspective view showing a state where a template is brought into close contact with a cladding film substrate.

FIG. 1A shows a cross-section obtained by cutting original master 10 on which convex portions 12 corresponding to optical waveguide cores are formed perpendicularly to a longer direction of the convex portion 12.

Figure 1B:
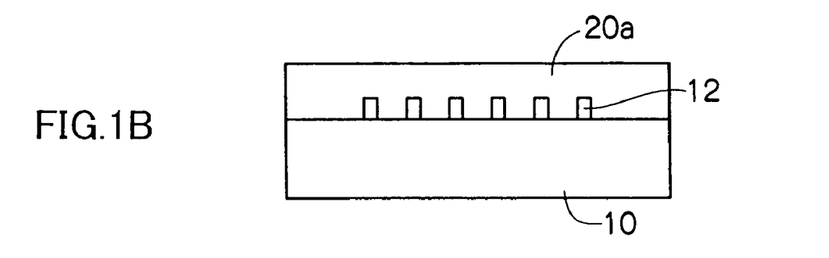

Subsequently, as shown in FIG. 1B, on a surface where the convex portions 12 of the original master 10 are formed, cured resin layer 20a of a template forming curable resin is formed. FIG. 1B shows a cross section obtained by cutting one in which the cured resin layer 20a of the template forming curable resin is formed on the original master 10 perpendicularly to a longer direction of the convex portion 12.

Figure 1C:
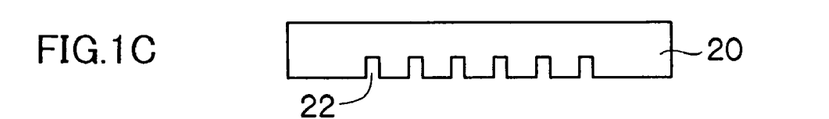

Subsequently, the cured resin layer 20a of the template forming curable resin is peeled off the original master 10 to form a mold (not shown in the drawing), subsequently both ends of the mold are cut so as to expose concave portions 22, thereby inlets 22a (FIG. 2) for filling a core forming curable resin into the concave portions 22, and outlets 22b (FIG. 2) for exhausting the resin from the concave portions 22 corresponding to the convex portions 12 are formed, and thereby template 20 is prepared (FIG. 1C).

Figure 1D:
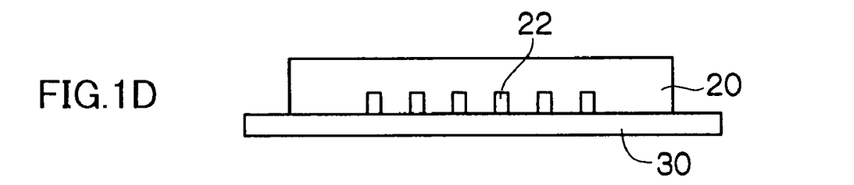
Figure 1E:
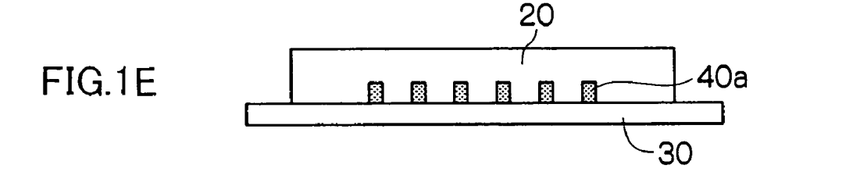

Against the template 20 thus prepared, cladding film substrate 30 is brought into close contact (FIG. 1D and FIG. 2). FIG. 1D shows a sectional diagram obtained by cutting one in which the template and the film substrate are brought into close contact perpendicularly to a longer direction of the concave portion (A-A cross section in FIG. 2). Subsequently, core forming curable resin 40a is filled from the inlets 22a of the template into the concave portions 22 of the template by making use of the capillary phenomenon. From the outlets 22b at the other tip ends of the concave portions 20, the core forming curable resin is exhausted. FIG. 1E shows a sectional diagram obtained by cutting one in which the curable resin is filled in the concave portions of the template perpendicularly to a longer direction of the concave portion.

Figure 1F:
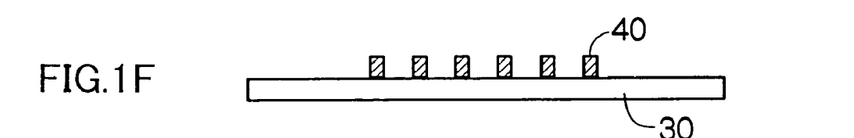

Thereafter, the core forming curable resin in the concave portions of the template is cured followed by peeling the template. FIG. 1F shows a sectional diagram obtained by cutting one in which optical waveguide cores 40 are formed on the cladding film substrate perpendicularly to a longer direction of the core.

Figure 1G:
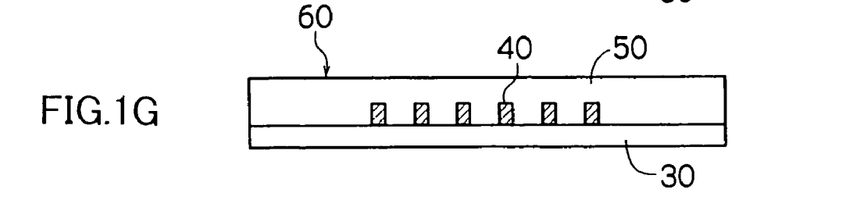

Furthermore, when cladding layer 50 is formed on a core formation surface of the cladding film substrate, polymer optical waveguide 60 according to the invention is prepared. FIG. 1G shows a cross section obtained by cutting the polymer optical waveguide 60 perpendicularly to a longer direction of the core.

Figure 3A:
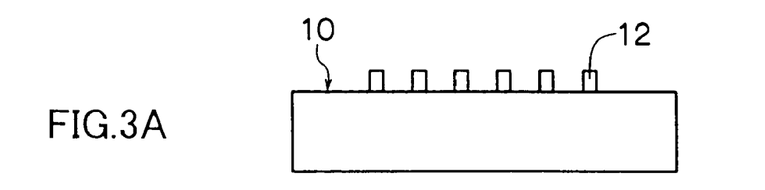
FIGS. 3A through 3G are schematic diagrams showing another example of a producing process of a polymer optical waveguide according to the invention.
Figure 3B:
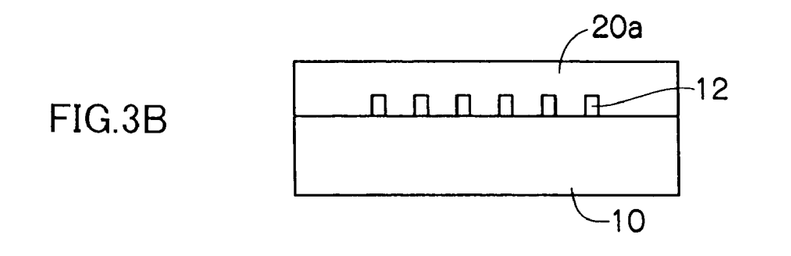
Figure 3C:
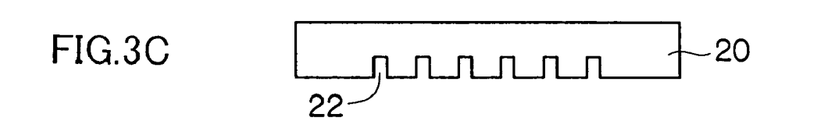
Figure 3D:
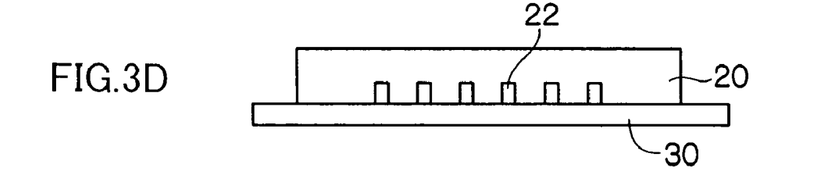
Figure 3E:
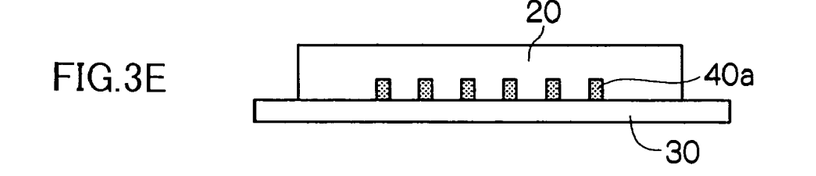
Figure 3F:
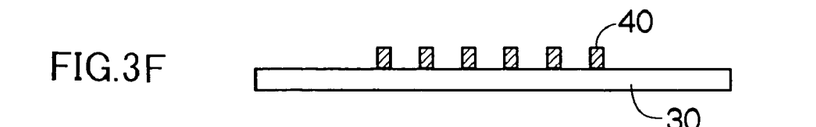
Figure 3G:
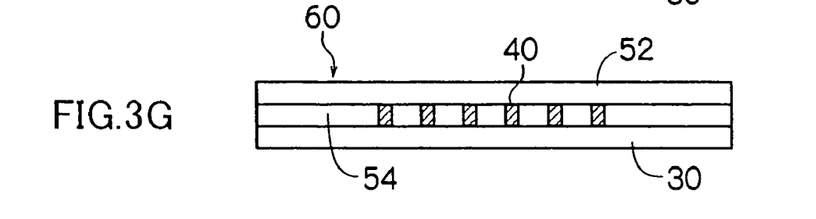

Furthermore, in FIGS. 3A through 3G, an example in which on the film substrate on which the cores are formed, a film that becomes a clad is adhered with an adhesive is shown. FIGS. 3A through 3F are in common with steps expressed by FIGS. 1A through 1F; that is, steps starting from the original master 10 to forming the cores 40 on the film substrate 30 are shown. Reference numerals are similar to those of FIGS. 1A to FIG. 1F. FIG. 3G shows a cross section obtained by cutting a polymer optical waveguide 60 that is obtained by the step in which on a core formation surface of the film substrate film 52 that becomes a clad is adhered by means of adhesive 54 perpendicularly to a longer direction of the core. In FIG. 3G, similarly to in FIG. 1G, reference numerals 30 and 40, respectively, show the cladding film substrate and the core.

Furthermore, in a method of producing a polymer optical waveguide according to the invention, it is preferable that the template is provided with two or more through holes that communicate, respectively, with one ends and the other ends (inlets and outlets for filling or exhausting the core forming curable resin) of the concave portions corresponding to the optical waveguide core convex portions; and into the through hole at one end of the concave portion of the template, the core forming curable resin is filled in, and from the through hole at the other end of the concave portion of the template, vacuum suction is applied to fill the core forming curable resin in the concave portion of the template. By filing the core forming curable resin by use of the template as mentioned above, the filling speed can be drastically increased, adhesiveness between the template and the film substrate is further improved and air bubbles can be inhibited from mingling.

Two or more through holes can be disposed. In the case of there being for instance one Y branch, three through holes are necessary to be disposed, and in the case of there being three Y branches to form 1 to 8 branching, nine through holes are necessary to be disposed to fill the core forming curable resin in the concave portions. Furthermore, the branching can include multi-stage branching.

The through hole that is disposed on a side of an inlet of the core forming curable resin has a function of a liquid (core forming curable resin) reservoir. Furthermore, the through hole that is disposed on a side of an outlet of the core forming curable resin is used, when the resin is filled in the concave portion of the template, to perform vacuum suction to reduce pressure of the concave portion of the template. There are no particular restrictions on a shape and a magnitude of the through hole on the inlet side as far as the through hole communicates with an inlet end of the concave portion and has a function as a liquid reservoir. Furthermore, there are no particular restrictions on a shape and a magnitude of the through hole on the outlet side as far as the through hole communicates with an outlet end of the concave portion and can be used to apply the vacuum suction.

The through hole disposed on the side of the inlet of the core forming curable resin of the template concave portion has a function as a liquid reservoir. Accordingly, when a sectional area thereof, in the case of the template being brought into close contact with the cladding film substrate, is made larger on a side that comes into contact with the substrate and smaller as departs from the substrate, after the core forming curable resin is filled in the concave portion and cured, the template becomes easily peeled off the substrate. Since there is no need of providing a function of a liquid reservoir to the through hole on the side of the outlet of the core forming curable resin, there is no need of particularly adopting such a sectional structure.

The template with the through holes can be formed, for instance, in such a way that a mold in which concave portions corresponding to optical waveguide core convex portions are formed as mentioned above is prepared, the mold is punched out into a predetermined shape to form through holes, and, at this time the mold is punched out so that, inside of the through holes, an inlet for filling the core forming curable resin and an outlet for exhausting the core forming curable resin from the concave portion may appear. Even in the case of the punched out through hole, since adhesiveness between the template and the cladding film substrate is excellent and a gap is not formed with the cladding film substrate except for the template concave portion, there are no worries of the core forming curable resin intruding into other than the concave portion.

Furthermore, the through hole may be formed not only by removing all of the cured resin layer (punched out type) in a thickness direction of the template as mentioned above but also by partially leaving the template in a thickness direction of the template. In this case, the template is disposed so that the through hole may be exposed below the cladding film substrate.

Examples of the preparation of the template with the through holes further include a method in which an original master is provided with not only convex portions corresponding to the optical waveguide cores but also with convex portions for forming the through holes (in the case of punched out through holes, a height of this convex portion is made higher than a thickness of the cured resin layer of the template forming curable resin); on the original master the template forming curable resin is coated so that the convex portions for the through holes may punch through the resin layer (punched out through hole) or the convex portions may hide; subsequently, the resin layer is cured; and, thereafter, the cured resin layer is peeled off the original master.

Figure 4A:
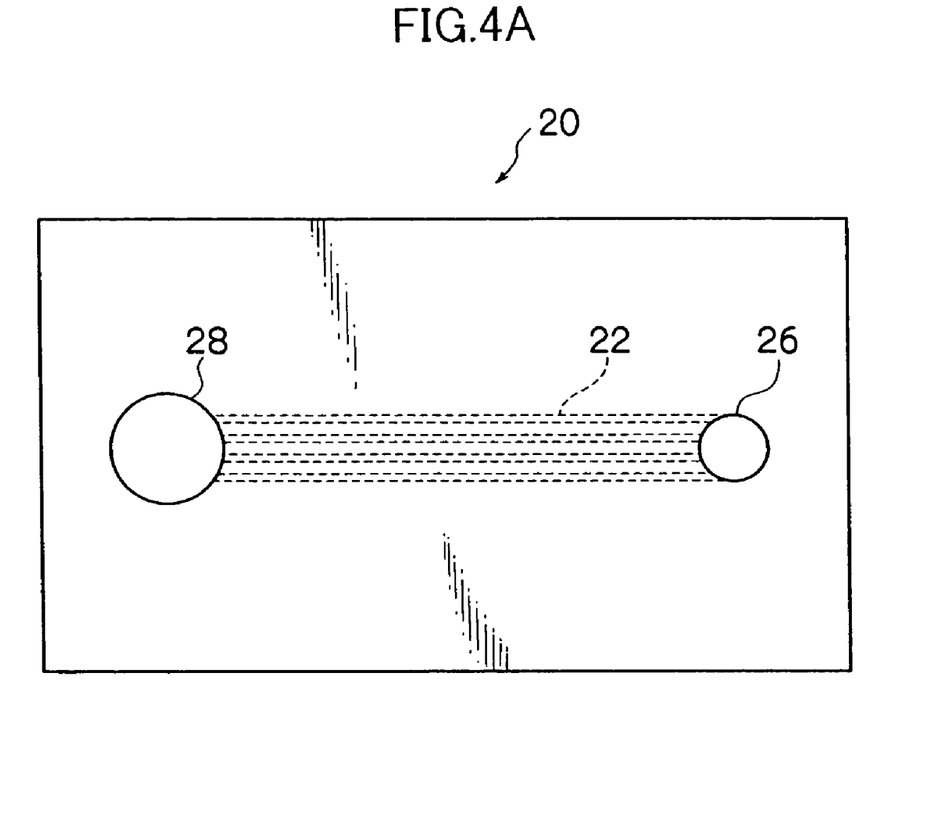
FIG. 4A is a plan view of a schematic diagram showing one example of a template that is used in the invention.
Figure 4B:
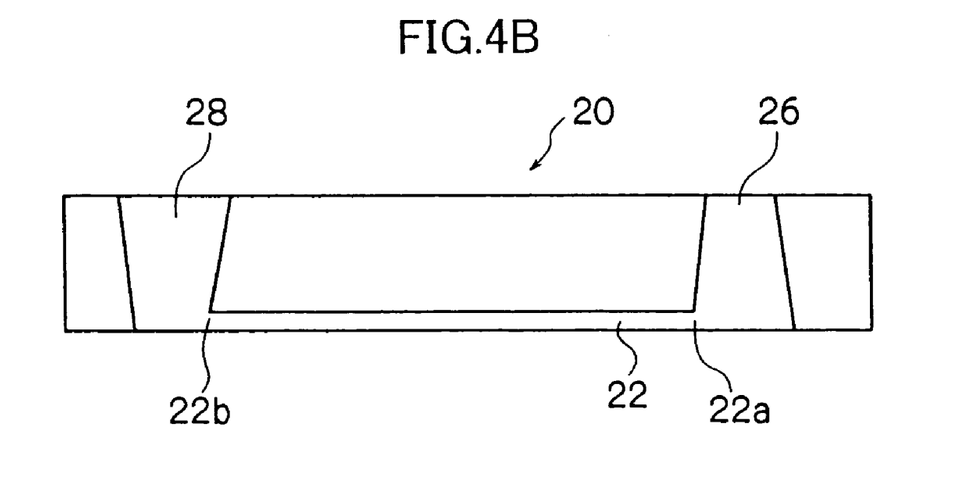
FIG. 4B is a sectional view of a schematic diagram showing one example of a template that is used in the invention.

In FIGS. 4A and 4B, schematic diagrams of an example of the template that is used in the invention are shown. FIG. 4A shows a plan view of template 20; two through holes 26 and 28 disposed on an inlet side of the core forming curable resin of the template concave portions 22 and on an outlet side thereof are punched out holes; a plane shape of the through hole is a circle. Furthermore, FIG. 4B shows a cross section of the template cut along a longer direction of the template so that the concave portion 22 of the template and two through holes 26, 28 may appear; reference numerals 22a and 22b respectively show an inlet and an outlet. A sectional area of the through hole 26 of the inlet side is larger on a side contacting the cladding film substrate (a side on which the concave portion is formed) and becomes smaller as departs from the substrate. On the other hand, a sectional area of the through hole 28 of the outlet side is smaller on a side t contacting the cladding film substrate and becomes larger as departs from the substrate (in accordance with an aperture of a vacuum suction tube). However, it is not restricted to such a sectional structure.

Figure 5:
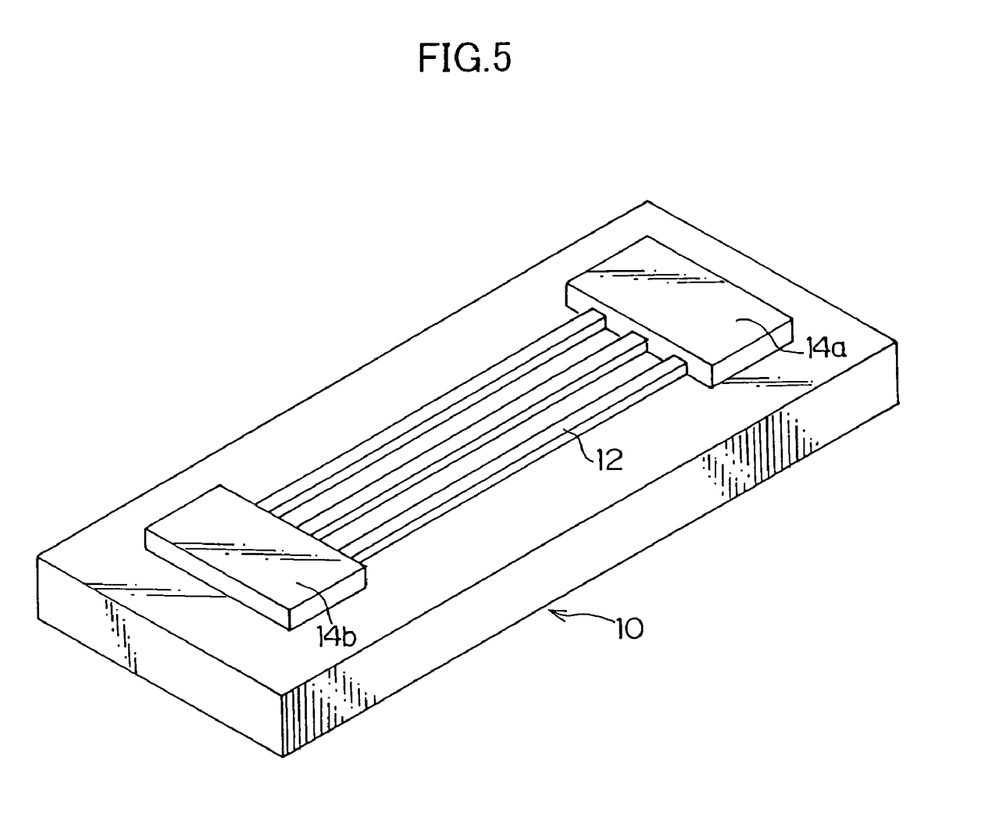
FIG. 5 is a perspective view showing one example of an original master that is used for producing the template.

FIG. 5 is a perspective view showing an example of an original master having convex portions used for forming through holes. Reference numerals 10, 12, 14a and 14b denote an original master, convex portions corresponding to optical waveguide cores, a convex portion for forming a through hole on an inlet side of the core forming curable resin and a convex portion for forming a through hole on an outlet side of the resin, respectively.

In the following, embodiments according to the invention will be explained.

A first embodiment according to the invention is a method for producing a polymer optical waveguide comprising the steps of (1) preparing a template that is made of a template forming curable resin and has a concave portion corresponding to an optical waveguide core convex portion, (2) applying an ozone treatment or irradiating light having a wavelength of 300 nm or less to at least one of a surface of the template having the concave portion and a core formation surface of a cladding film substrate, (3) bringing the cladding film substrate into close contact with the template, (4) filling a core forming curable resin into the concave portion of the template with which the cladding film substrate is in close contact, (5) curing the filled core forming curable resin to form a core, (6) removing the template from the cladding film substrate, and (7) forming a cladding layer on the cladding film substrate on which the core has been formed.

A second embodiment according to the invention is a method according to the first embodiment, wherein the light having a wavelength of 300 nm or less is irradiated by an excimer radiation source.

A third embodiment according to the invention is a method according to the second embodiment, wherein the excimer radiation source is a dielectric barrier discharge excimer radiation source having a central emission wavelength of 172 nm.

A fourth embodiment according to the invention is a method according to the first embodiment, wherein the template forming curable resin is liquid silicone rubber.

A fifth embodiment according to the invention is a method according to the fourth embodiment, wherein the liquid silicone rubber is liquid dimethyl siloxane rubber.

A sixth embodiment according to the invention is a method according to the first embodiment, wherein the core forming curable resin is an acrylic UV curable resin.

A seventh embodiment according to the invention is a method according to the first embodiment, wherein the core forming curable resin is an epoxy UV curable resin.

An eighth embodiment according to the invention is a method according to the first embodiment, wherein a refractive index of the cladding film substrate is 1.55 or less.

A ninth embodiment according to the invention is a method according to the first embodiment, wherein the cladding film substrate is an alicyclic acrylic resin film.

A tenth embodiment according to the invention is a method according to the first embodiment, wherein the cladding film substrate is an alicyclic olefinic resin film.

An eleventh embodiment according to the invention is a method according to the tenth embodiment, wherein the alicyclic olefinic resin film is a resin film having a norbornene structure on a main chain and a polar group on a side chain.

A twelfth embodiment according to the invention is a method according to the first embodiment, wherein a surface energy of the template is in a range of 10 to 30 dyn/cm.

A thirteenth embodiment according to the invention is a method according to the first embodiment, wherein a Share rubber hardness of the template is in a range of 15 to 80.

A fourteenth embodiment according to the invention is a method according to the first embodiment, wherein a surface roughness of the template is 0.2 μm or less.

A fifteenth embodiment according to the invention is a method according to the first embodiment, wherein the template is light transmissive in a UV region and/or visible region.

A sixteenth embodiment according to the invention is a method according to the first embodiment, wherein a volume change when the core forming curable resin is cured is 10% or less.

A seventeenth embodiment according to the invention is a method according to the first embodiment, wherein difference between a refractive index of the cladding film substrate and that of the cladding layer is 0.05 or less.

An eighteenth embodiment according to the invention is a method according to the first embodiment, wherein a refractive index of the core is 1.50 or greater.

A nineteenth embodiment according to the invention is a method for producing a polymer optical waveguide comprising the steps of (1) preparing a template that is made of a template forming curable resin and has a concave portion corresponding to an optical waveguide core convex portion, (2) applying an ozone treatment or irradiating light having a wavelength of 300 nm or less to at least one of a surface of the template having the concave portion and a core formation surface of a cladding film substrate, (3) bringing the cladding film substrate into close contact with the template, (4) filling a core forming curable resin into the concave portion of the template with which the cladding film substrate is in close contact, and (5) curing the filled core forming curable resin to form a core, wherein the template is light transmissive, and difference between a refractive index of the template and that of the core is 0.01 or more.

EXAMPLES

In the following, the present invention is more specifically explained with reference to examples. However, the scope of the invention should not be construed to be limited to these examples.

Example 1

After a thick film resist (SU-8 manufactured by Micro-Chem Corp.) is spin-coated on a Si substrate, it is pre-baked at 80 degree centigrade, exposed through a photo-mask, developed, and thereby convex portions having a square cross section (width: 50 μm, height: 50 μm, and length: 150 mm) are formed. Subsequently, this is post-baked at 120 degree centigrade, and thereby an original master used for producing an optical waveguide core is prepared.

Subsequently, after a mold release agent is coated on the original master, a blend of thermosetting liquid dimethyl siloxane rubber (SYLGARD184 manufactured by Dow-Corning Corporation, viscosity 5000 mPa·s) and a curing agent thereof is flowed in followed by heating at 120 degree centigrade for 30 minutes to cure further followed by peeling, and a mold (a thickness of the mold: 3 mm) having concave portions corresponding to the convex portions square in the cross section are prepared.

Furthermore, through holes that are circular in plane shape and taper-like in a sectional shape in a template thickness direction such as shown in FIG. 4B are formed by punching out so that the through holes may communicate with concave portions at one ends and the other ends of the concave portions. The through hole on a side where the core forming curable resin intrudes of the template is made to have a diameter of 4 mm in a surface where the template comes into contact with the cladding film substrate and a diameter of 3.5 mm in a surface on an opposite side of the template. Furthermore, the through hole for vacuum suction is formed so that a magnitude of the through hole may be the same as that on the inlet side and the taper may be reversed.

The template has the surface energy of 22 dyn/cm, the Share rubber hardness of 60, the surface roughness of 10 nm or less, and the UV transmittance of 80% or more; and furthermore since it is transparent, a substance under it can be well observed.

A surface where the concave portions are formed of the template and a core formation surface of the film substrate (ARTON film manufactured by JSR Corporation, refractive index 1.510) that is one size larger than the template and has a thickness of 188 μm are subjected to light irradiation for 5 minutes in air by use of a xenon excimer lamp (UER-20-172A manufactured by Ushio Inc., 10 mW/cm$^2$) having a central emission wavelength of 172 nm.

Subsequently, when the template and the ARTON film are brought into close contact through treated surfaces thereof and several drops of a UV curable resin (PJ3001 manufactured by JSR Corporation) having the viscosity of 1300 mPa·s are dropped into the through hole at the inlet side of the template and vacuum-sucked from the through hole on the outlet side by means of a diaphragm type suction pump (maximum suction pressure 33.25 KPa), the UV curable resin is filled in the concave portion at a filling speed of 0.8 cm/min.

Subsequently, UV light of 50 mW/cm$^2$ is irradiated through the template for 5 minutes to perform the UV curing. When the template is peeled off the ARTON film, cores having the same shape as those of the original master are formed on the ARTON film. The refractive index of the core is 1.591.

Subsequently, over an entire surface of the core formation surface of the ARTON film, a UV curable resin (manufactured by JSR Corporation) of which refractive index after curing is 1.510 the same as that of the ARTON film is coated, thereafter UV light of 50 mW/cm$^2$ is irradiated for 5 minutes to perform the UV curing (a film thickness after curing is 10 μm). A flexible polymer optical waveguide is obtained. Subsequently, by use of a dicing saw provided with a blade for Si, the optical waveguide sheet is cut perpendicularly to a longer direction of the core to expose the cores with a mirror surface, and thereby an input portion of light is prepared. The loss of the polymer optical waveguide is 0.33 dB/cm.

Example 2

Steps up to the step of forming cores on the ARTON film are performed in the same manner as in Example 1.

Subsequently, on the core formation surface of the ARTON film, an ARTON film (film thickness 188 μm) is adhered by use of an adhesive (manufactured by JSR Corporation) having the refractive index of 1.510, and thereby a flexible polymer optical waveguide is prepared. Subsequently, by use of a dicing saw provided with a blade for Si, the optical waveguide sheet is cut perpendicularly to a longer direction of the core to expose a core with a mirror surface, and thereby an input portion of light is prepared. The loss of the polymer optical waveguide is 0.33 dB/cm.

Example 3

In the same manner as in Example 1, a template is prepared. Subsequently, by use of a xenon excimer lamp (UER-20-172A manufactured by Ushio Inc., 10 mW/cm$^2$) having a central emission wavelength of 172 nm, only on a film substrate (ARTON film manufactured by JSR Corporation, refractive index 1.510) that is one size larger than the template and has a thickness of 188 μm, excimer light is irradiated in air for 5 minutes to apply the surface treatment.

Subsequently, when the template and the ARTON film are brought into close contact and several drops of a UV curable resin (epoxy waveguide forming resin manufactured by NTT-AT Inc.) having the viscosity of 820 mPa·s are dropped into the inlet side through hole of the template and vacuum-sucked from the through hole on the outlet side (vacuum suction side) by means of a diaphragm type suction pump (maximum suction pressure 33.25 KPa), the UV curable resin is filled in the concave portion at a filling speed of 1.5 cm/min.

Subsequently, UV light of 50 mW/cm$^2$ is irradiated through the template for 5 minutes to perform the UV curing. When the template is peeled off the ARTON film, cores having the same shape as those of the convex portions of the original master are formed on the ARTON film. The refractive index of the core is 1.570.

Subsequently, on the core formation surface of the ARTON film, an ARTON film (film thickness 188 μm) is adhered by use of an adhesive (manufactured by JSR Corporation) having the refractive index of 1.510, and thereby a flexible polymer optical waveguide is obtained. Subsequently, by use of a dicing saw provided with a blade for Si, the optical waveguide sheet is cut perpendicularly to a longer direction of the core to expose a core with a mirror surface, and thereby an input portion of light is prepared. The loss of the polymer optical waveguide is 0.15 dB/cm.

Example 4

A polymer optical waveguide is prepared in the same manner as in Example 1, except that the ozone treatment is applied for 10 minutes on the ARTON film and the template instead of the irradiation of excimer light. The filling speed of the UV curable resin into the concave portion of the template is 0.6 cm/min.

Example 5

A polymer optical waveguide is prepared in the same manner as in Example 3, except that the ozone treatment is applied for 10 minutes on the ARTON film instead of the irradiation of excimer light. The filling speed of the UV curable resin into the concave portion of the template is 1.2 cm/min.

Example 6

A polymer optical waveguide is prepared in the same manner as in Example 1 except that a polyethylene terephthalate film (film thickness 200 μm) is used instead of the ARTON film. The filling speed of the UV curable resin into the concave portion of the template is 0.8 cm/min.

Comparative Example 1

A polymer optical waveguide is prepared in the same manner as in Example 1 except that excimer light is not irradiated on the ARTON film and the template. The filling speed of the UV curable resin into the concave portion of the template is 0.2 cm/min.

Comparative Example 2

A polymer optical waveguide is prepared in the same manner as in Example 3 except that excimer light is not irradiated on the ARTON film and the template. The filling speed of the UV curable resin into the concave portion of the template is 0.2 cm/min.

Comparative Example 3

A polymer optical waveguide is prepared in the same manner as in Example 6 except that excimer light is not irradiated on the polyethylene terephthalate film and the template. The UV curable resin can be filled in the concave portion of the template (the filling speed 0.3 cm/min); however, when the template is peeled after the UV curing, the core portion is separated from the cladding film.

A method of producing a polymer optical waveguide according to the invention has very simplified production steps. Accordingly, a polymer optical waveguide can be easily manufactured, and in comparison with an existing method of producing a polymer optical waveguide, the polymer optical waveguide can be manufactured at extremely low cost.

Furthermore, according to the method of producing a polymer optical waveguide according to the invention, since a shape, etc. of the polymer optical waveguide can be freely designed, a flexible polymer optical waveguide that is less in transmission loss, high in accuracy, and can be freely mounted on various instruments can be obtained.

Still furthermore, since the filling speed of a core forming curable resin into a concave portion of a template is improved, a method of producing a polymer optical waveguide with high productivity is provided. Furthermore, a range of choice of core materials, cladding film substrates and cladding layers for the polymer optical waveguide can be expanded.

What is claimed is:

1. A method for producing a polymer optical waveguide comprising the steps of:
   (1) preparing a template that is made of a template forming curable resin and has a concave portion corresponding to an optical waveguide core convex portion, and that is provided with through holes which extend at respective ends of the concave portion from the concave portion through to a surface of the template opposite to a surface having the concave portion thereon and which are, respectively, a through hole having a function of a liquid reservoir and another through hole for performing vacuum suction;
   (2) applying an ozone treatment or irradiating light having a wavelength of 300 nm or less to at least one of the surface of the template having the concave portion and a core formation surface of a cladding film substrate wherein the cladding film substrate is an alicyclic olefinic resin film;
   (3) bringing the cladding film substrate into close contact with the template such that the surface of the template having the concave portion and the core formation surface of the cladding film substrate surface directly contact each other, the at least one of the surface of the template having the concave portion and the core formation surface of the cladding film substrate having been subjected to the application of the ozone treatment or the irradiation of light in step (2);
   (4) filling in the core forming curable resin into the concave portion of the template by applying suction from the through hole for performing vacuum suction;
   (5) curing the filled core forming curable resin to form a core;
   (6) removing the template from the cladding film substrate; and
   (7) forming a cladding layer on the cladding film substrate on which the core has been formed.

2. The method of claim 1, wherein the light having a wavelength of 300 nm or less is irradiated by an excimer radiation source.

3. The method of claim 2, wherein the excimer radiation source is a dielectric barrier discharge excimer radiation source having a central emission wavelength of 172 nm.

4. The method of claim 1, wherein the template forming curable resin is liquid silicone rubber.

5. The method of claim 4, wherein the liquid silicone rubber is liquid dimethyl siloxane rubber.

6. The method of claim 1, wherein the core forming curable resin is an acrylic UV curable resin.

7. The method of claim 1, wherein the core forming curable resin is an epoxy UV curable resin.

8. The method of claim 1, wherein a refractive index of the cladding film substrate is 1.55 or less.

9. The method of claim 1, wherein the alicyclic olefinic resin film is a resin film having a norbornene structure on a main chain and a polar group on a side chain.

10. The method of claim 1, wherein a surface energy of the template is in a range of 10 to 30 dyn/cm.

11. The method of claim 1, wherein a Share rubber hardness of the template is in a range of 15 to 80.

12. The method of claim 1, wherein a surface roughness of the template is 0.2 µm or less.

13. The method of claim 1, wherein the template is light transmissive in at least one of a UV region and a visible region.

14. The method of claim 1, wherein a volume change when the core forming curable resin is cured is 10% or less.

15. The method of claim 1, wherein difference between a refractive index of the cladding film substrate and that of the cladding layer is 0.05 or less.

16. The method of claim 1, wherein a refractive index of the core is 1.50 or greater.

17. A method for producing a polymer optical waveguide comprising the steps of:
   (1) preparing a template that is made of a template forming curable resin and has a concave portion corresponding to an optical waveguide core convex portion, and that is provided with through holes which extend at respective ends of the concave portion from the concave portion through to a surface of the template opposite to a surface having the concave portion thereon and which are, respectively, a through hole having a function of a liquid reservoir and another through hole for performing vacuum suction;
   (2) applying an ozone treatment or irradiating light having a wavelength of 300 nm or less to at least one of the surface of the template having the concave portion and a core formation surface of a cladding film substrate wherein the cladding film is an alicyclic oleofinic resin film;
   (3) bringing the cladding film substrate into close contact with the template such that the surface of the template having the concave portion and the core formation surface of the cladding film substrate surface directly contact each other, the at least one of the surface of the template having the concave portion and the core formation surface of the cladding film substrate having been subjected to the application of the ozone treatment or the irradiation of light in step (2);
   (4) filling in the core forming curable resin into the concave portion of the template by applying suction from the through hole for performing suction; and
   (5) curing the filled core forming curable resin to form a core,
   wherein the template is light transmissive, and a difference between a refractive index of the template and that of the core is 0.01 or more.

* * * * *